US011716456B2

(12) United States Patent
Samples et al.

(10) Patent No.: US 11,716,456 B2
(45) Date of Patent: Aug. 1, 2023

(54) AUTOCALIBRATED NEAR-EYE DISPLAY

(71) Applicant: Microsoft Technology Licensing, LLC, Redmond, WA (US)

(72) Inventors: Michael Edward Samples, Redmond, WA (US); Dmitry Reshidko, Sammamish, WA (US); Rayna Demaster-Smith, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 141 days.

(21) Appl. No.: 17/326,965

(22) Filed: May 21, 2021

(65) Prior Publication Data

US 2022/0377312 A1     Nov. 24, 2022

(51) Int. Cl.
| | |
|---|---|
| *G09G 5/00* | (2006.01) |
| *H04N 13/327* | (2018.01) |
| *H04N 13/344* | (2018.01) |
| *H04N 13/363* | (2018.01) |
| *H04N 9/31* | (2006.01) |

(52) U.S. Cl.
CPC ......... *H04N 13/327* (2018.05); *H04N 9/3164* (2013.01); *H04N 9/3194* (2013.01); *H04N 13/344* (2018.05); *H04N 13/363* (2018.05)

(58) Field of Classification Search
CPC .. H04N 13/327; H04N 13/344; H04N 13/363; H04N 9/3164
USPC ............................................................ 345/7
See application file for complete search history.

(56) References Cited

U.S. PATENT DOCUMENTS

| | | | |
|---|---|---|---|
| 2015/0312558 A1 | 10/2015 | Miller et al. | |
| 2017/0139211 A1* | 5/2017 | Trail | G02B 27/0172 |
| 2017/0295362 A1* | 10/2017 | Travis | H04N 13/128 |
| 2017/0353714 A1 | 12/2017 | Poulad et al. | |
| 2018/0074578 A1* | 3/2018 | Robbins | G09G 5/00 |
| 2018/0348861 A1* | 12/2018 | Uscinski | G06V 20/20 |
| 2019/0313915 A1* | 10/2019 | Tzvieli | G01J 5/12 |

(Continued)

FOREIGN PATENT DOCUMENTS

WO     2020132243 A1     6/2020

OTHER PUBLICATIONS

"International Search Report and Written Opinion Issued in PCT Application No. PCT/US22/026617", dated Aug. 22, 2022, 10 Pages.

(Continued)

*Primary Examiner* — Jonathan M Blancha
(74) *Attorney, Agent, or Firm* — Alleman Hall Creasman & Tuttle LLP

(57) ABSTRACT

A near-eye display device comprises right and left display projectors, expansion optics, and inertial measurement units (IMUs), in addition to a plurality of angle-sensitive pixel (ASP) elements and a computer. The right and left expansion optics are configured to receive respective display images from the right and left display projectors and to release expanded forms of the display images. The right IMU is fixedly coupled to the right display projector, and the left IMU is fixedly coupled to the left display projector. Each ASP element is responsive to an angle of light of one of the respective display images as received into the right or left expansion optic. The computer is configured to receive output from the right IMU, the left IMU and the plurality of ASP elements, and render display data for the right and left display projectors based in part on the output.

20 Claims, 10 Drawing Sheets

(56) References Cited

U.S. PATENT DOCUMENTS

| | | | |
|---|---|---|---|
| 2020/0018968 A1* | 1/2020 | Edwin | G02B 27/0081 |
| 2021/0091130 A1* | 3/2021 | Bonakdar | H01L 27/14645 |
| 2021/0118218 A1* | 4/2021 | Huang | G01C 19/00 |
| 2021/0217147 A1* | 7/2021 | Edwin | H04N 13/344 |
| 2021/0294106 A1* | 9/2021 | Meitav | G02B 27/0093 |

OTHER PUBLICATIONS

"Angle-sensitive pixel", Retrieved from: https://en.wikipedia.org/wiki/Angle-sensitive_pixel, Oct. 18, 2020, 2 Pages.

"Angle-sensitive pixels: a new paradigm for low-power, low-cost 2D and 3D sensing", Retrieved from: https://www.youtube.com/watch?v=mtvwMpke0bg, Mar. 16, 2012, 4 Pages.

"Canon develops world's first 1-megapixel SPAD image sensor", Retrieved from: https://global.canon/en/news/2020/20200624.html, Jun. 24, 2020, 10 Pages.

"Inertial Guidance Test and Calibration System", Retrieved from: https://assets.ctfassets.net/4yshkjk9i7lb/KhOPDfDXDCBI7TBqtPz0I/b512502159ece8d4e66f6109b673ca58/ASTU_AC21x_Data_Sheet_-_Letter_-_06.22.20.pdf, Jun. 22, 2020, 3 Pages.

"Introducing Dynamics 365 Remote Assist for HoloLens 2 and mobile devices", Retrieved from: https://www.youtube.com/watch?v=d3YT8j0yYI0, Apr. 1, 2020, 6 Pages.

"Stereopsis", Retrieved from: https://en.wikipedia.org/wiki/Stereopsis, Mar. 2, 2021, 14 Pages.

"Epipolar geometry", Retrieved from: https://en.wikipedia.org/wiki/Epipolar_geometry, Mar. 7, 2021, 3 Pages.

Gokturk, et al., "A Time-Of-Flight Depth Sensor—System Description, Issues and Solutions", In Conference on Computer Vision and Pattern Recognition Workshop, Jun. 27, 2004, 9 Pages.

Gold, T, "Visual Requirements Study for Head-Up Displays", In Sperry Rand Corp Great Neck NY Sperry Gyroscope, Mar. 1972, 64 Pages.

Koifman, Vladimir, "Yole about iPad Pro SPAD LiDAR: Sony Landed on the Moon Without Us Knowing", Retrieved from: https://image-sensors-world.blogspot.com/2020/05/yole-about-ipad-pro-spad-lidar-sony.html, May 10, 2020, 15 Pages.

Morimoto, et al., "A megapixel time-gated SPAD image sensor for 2D and 3D imaging applications", In Journal of Optica, vol. 7, Issue 4, Dec. 30, 2019, 11 Pages.

Nishimura, et al., "Disambiguating Monocular Depth Estimation with a Single Transient", In European Conference on Computer Vision, Aug. 23, 2020, pp. 1-18.

Self, Herschelc., "Optical Tolerances for Alignment and Image Diferences for Binocular Kelmet-Mounted Displays", In AAMELI-TY 43619, May 1986, 37 Pages.

Zheng, Guoan, "Angle-sensitive pixel design for wavefront sensing", In Repository of arXiv preprint arXiv:1304.7339, Apr. 27, 2013, 4 Pages.

Jayasuriya, Suren., "Plenoptic Imaging and Vision Using Angle Sensitive Pixels", In Dissertation of Cornell University, Jan. 30, 2017, 182 Pages.

Coutant, et al., "Population Distribution of Stereoscopic Ability", In Journal of Ophthalmic and Physiological Optics, vol. 13, Issue 1, Jan. 1993. pp. 3-7.

Arsenal, Frankford., "Optical Design (Military Standardization Handbook, MIL-HDBK-141)", Published by Defense Supply Agency, Jan. 1, 1962, 714 Pages.

\* cited by examiner

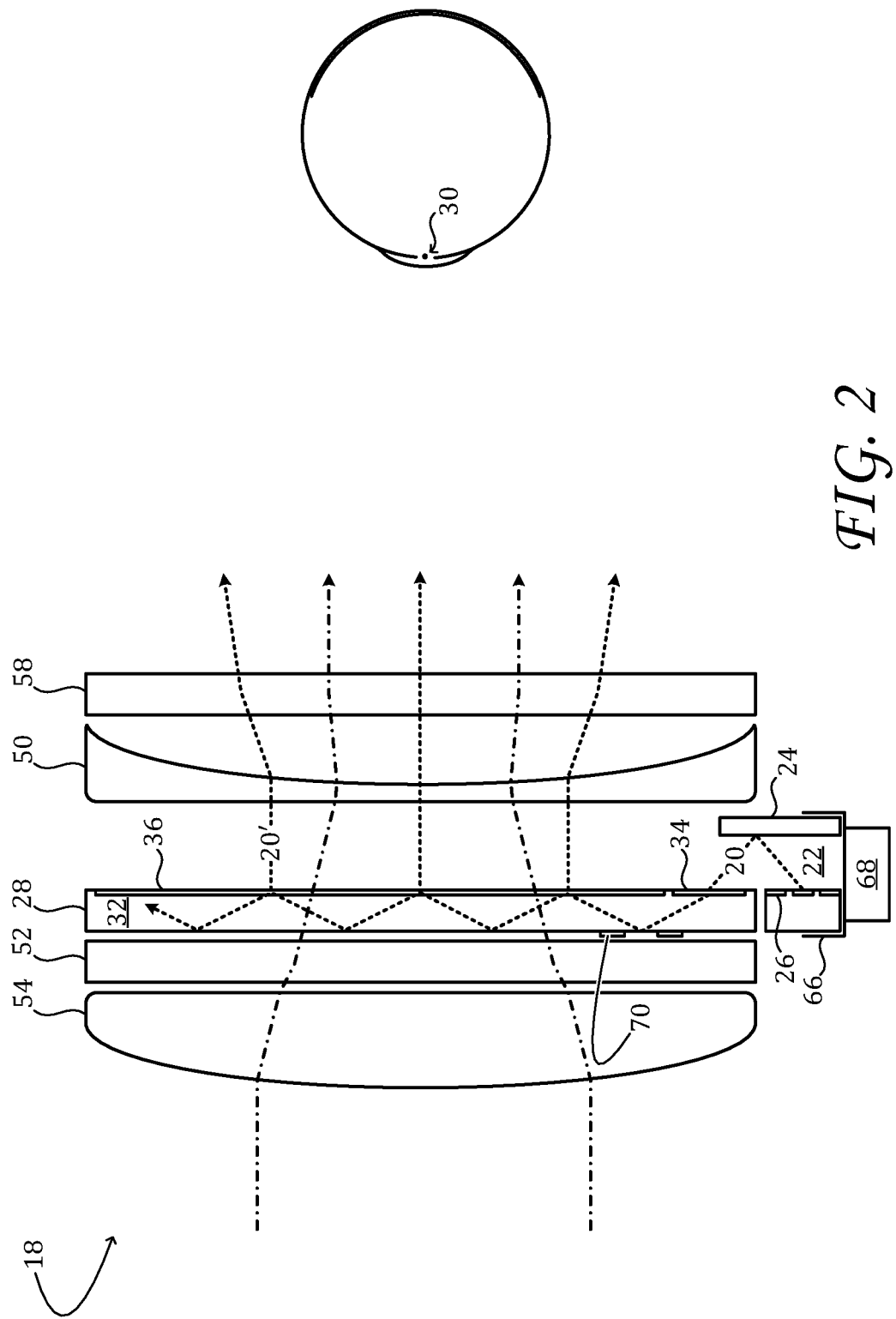

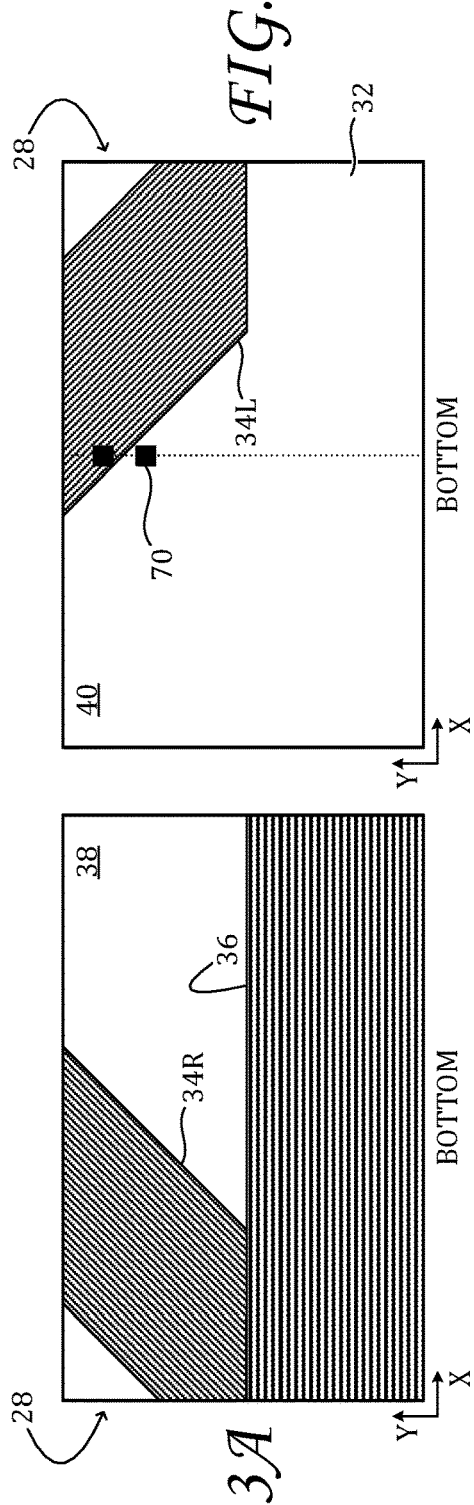
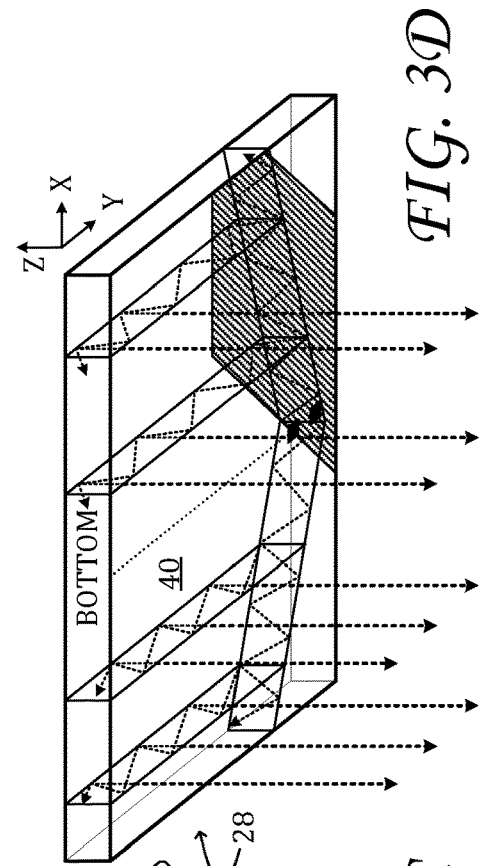
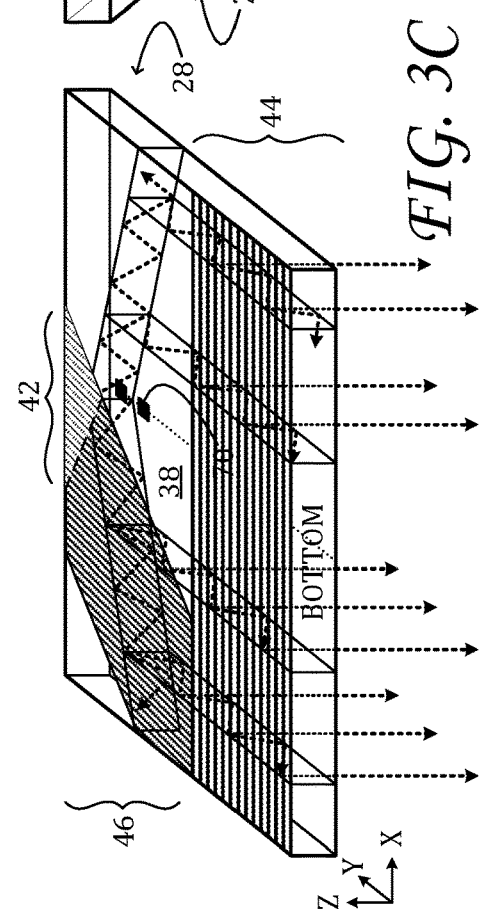

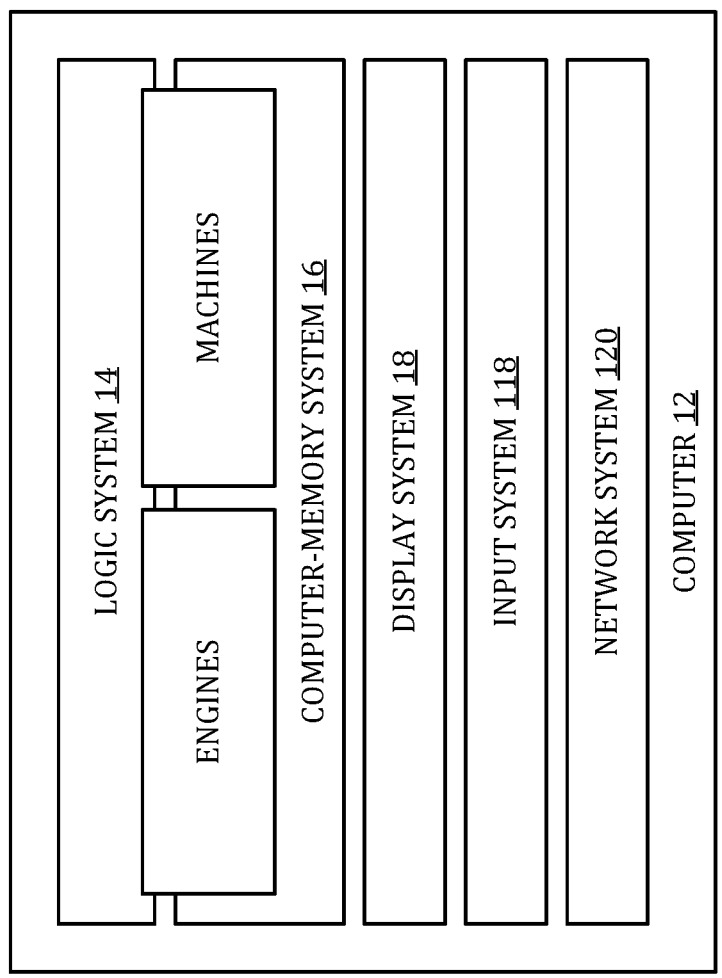

AUTOCALIBRATED NEAR-EYE DISPLAY

BACKGROUND

Near-eye display technology has evolved in recent years to become an emerging consumer technology. In head-worn display devices, for example, binocular near-eye display provides 3D stereo vision for virtual-reality (VR) presentation. When implemented using see-through optics, near-eye display enables mixed- or augmented-reality (AR) presentation, in which VR elements are admixed into a user's natural field of view. Despite such benefits, near-eye display technology faces various technical challenges. The challenges include accurate stimulation of the oculomotor depth cues that provide life-like and comfortable viewing for the display-device user.

SUMMARY

One aspect of this disclosure relates to a near-eye display device comprising right and left display projectors, expansion optics, and inertial measurement units (IMUs), in addition to a plurality of angle-sensitive pixel (ASP) elements and a computer. The right and left expansion optics are configured to receive respective display images from the right and left display projectors and to release expanded forms of the display images. The right IMU is fixedly coupled to the right display projector, and the left IMU is fixedly coupled to the left display projector. Each ASP element is responsive to an angle of light of one of the respective display images as received into the right or left expansion optic. The computer is configured to receive output from the right IMU, the left IMU and the plurality of ASP elements, and render display data for the right and left display projectors based in part on the output. With this configuration, a predefined stereo disparity between the expanded forms of the right and left display images is provided.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any or all disadvantages noted in any part of this disclosure.

BRIEF DESCRIPTION OF THE DRAWINGS

FIG. 2 shows aspects of an example monocular system of a near-eye display device.

FIGS. 3A through 3D show aspects of an example expansion optic of a monocular system of a near-eye display device.

FIG. 10 shows aspects of an example onboard computer of a near-eye display device.

DETAILED DESCRIPTION

Figure 1:
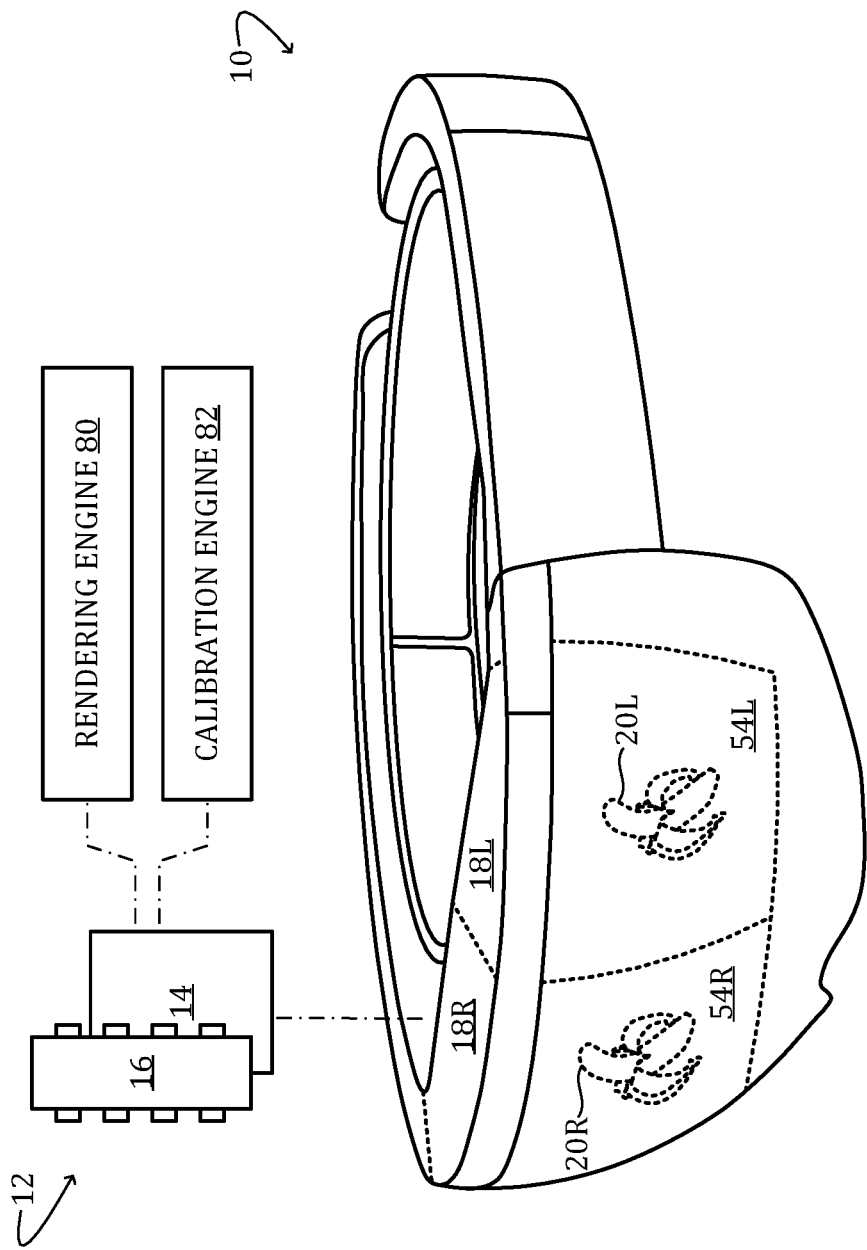
FIG. 1 shows aspects of an example near-eye display device.

This disclosure is presented by way of example and with reference to the drawing figures listed above. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

Certain defects of state-of-the-art binocular near-eye display devices are addressed herein. The disclosed configurations and methods are intended to increase user comfort and satisfaction with the accuracy of projected display content. More particularly, this disclosure provides a real-time autocalibration strategy using independent IMUs coupled to the right and left display-module assemblies (DMAs) of a near-eye display device, and ASP elements coupled to the expansion optics. Output from the IMUs and ASP elements is used to automatically adjust the display projection, thereby providing the intended stereo disparity irrespective of manufacturing tolerances and use-related device deformation.

In order to achieve accurate holographic rendering and user comfort, the alignment state of a near-eye display device must be known and applied during the display-rendering process. Alignment errors may accrue, however, due to defective initial calibration and/or deformation over the lifetime of the device. Some near-eye display devices provide a rigid design and integrate a display alignment tracker (DAT) system—i.e., a camera with a set of prisms and mirrors capable of simultaneously observing light from the right and left DMAs. In principle, a DAT camera can be used to improve stereoscopic accuracy by enabling runtime calibration of monocular alignment parameters (e.g., micro-electromechanical-system (MEMS) biphase and mirror amplitude control). However, a DAT camera adds cost and complexity, occupies significant space in the display device, and may have inadequate field-of-view or pixel sensitivity for precision alignment.

The autocalibration disclosed herein addresses binocular DMA extrinsics, monocular DMA intrinsics, relative waveguide/DMA rotations, and alignment of the display-coordinate frame to the head-tracking reference frame. It provides the following advantages over the state-of-the-art DAT approach. First, the solution herein is more robust—viz., less reliant on efficient light transmission through the expansion optics and on initial camera alignment. The solution herein is also more compact and less expensive, as ASP elements are smaller and less expensive than a DAT camera. Further, the correction patterns required for ASP element-based autocalibration can be made undetectable to the wearer. Further still, autocalibration and testing may be enacted at the module level for increased box build efficiency, and the same sensory input used to effect the autocalibration may also be leveraged to improve head tracking accuracy.

Turning now to the drawings, FIG. 1 shows aspects of an example near-eye display device 10. The near-eye display device is configured to be worn by a user and to display still or moving images in the user's field-of-view. In some examples, the near-eye display device may include or be part of an AR or VR system that presents computer-generated, holographic imagery in the user's field-of-view. In some examples, user-input componentry of the AR or VR system may enable the user to interact with (e.g., manipulate) such imagery. To support any, some, or all of these functions, inter alia, near-eye display device 10 includes an onboard computer 12 having a processor 14 and associated computer memory 16. In the example illustrated in FIG. 1, near-eye display device 10 takes the form of a head-mounted visor. In other examples, a near-eye display device may take the form of goggles, a helmet, or eyeglasses. In still other examples, a near-eye display device may be a component of a non-wearable display system, such as a display system installed in a vehicle.

Near-eye display device 10 is configured for binocular image display. To that end, the near-eye display device includes a right monocular system 18R that presents a right display image 20R in front of the user's right eye, and a left monocular system 18L that presents a left display image 20L in front the user's left eye. For stereoscopic display the right and left display images may be configured with stereo disparity (vide infra) appropriate to display a three-dimensional subject or scene.

FIG. 2 shows aspects of an example monocular system 18 of near-eye display device 10. The monocular system includes a display projector 22 configured to form a display image 20. The display projector includes a high-resolution spatial light modulator (SLM) 24 illuminated by light emitters 26. The light emitters may comprise light-emitting diodes (LEDs) or laser diodes, and the SLM may comprise a liquid-crystal-on-silicon (LCOS) or digital micromirror device (DMD), for example. The SLM and the light emitters are coupled operatively to computer 12. The computer controls the matrix of independent, light-directing pixel elements of the SLM so as to cause the SLM to modulate the light received from the light emitters and thereby form display image 20. By controlling the light modulation temporally as well as spatially, the computer may cause the display projector to project a synchronized sequence of display images (i.e., video). In the example shown in FIG. 2, the display image is formed by reflection from the SLM. In other examples, a display image may be formed by transmission through a suitably configured, transmissive SLM. Display projectors based on other technologies are equally envisaged—organic LED arrays, micro-LED (PLED) arrays, scanning-laser projectors, etc.

In monocular system 18, display light from display projector 22 passes through a physical aperture of finite size. Optics downstream of the display projector focus the display light onto the anatomical right or left pupil of the user. In doing so, the downstream optics direct the display light through an entry pupil, defined as the image of the physical aperture at the anatomical-pupil position. Due to the small size of the physical aperture and/or other features of monocular system 18, the entry pupil may be too small to align reliably to the user's anatomical pupil. Accordingly, monocular system 18 includes an expansion optic 28. The expansion optic is configured to receive display light through a relatively small entry pupil and to release the display light over an expanded exit pupil, which may be large enough to cover the entire area over which the user's pupil is likely to be. Such an area is called an 'eyebox'.

Continuing in FIG. 2, expansion optic 28 is configured to receive display image 20 from display projector 22 and to release an expanded form 20' of the display image toward the pupil position 30. In the illustrated example, the expansion optic includes an optical waveguide 32, an entry grating 34 and an exit grating 36. The expansion optic may also include other gratings not shown in FIG. 2. It will be understood that the term 'grating' is broadened herein to include any kind of diffractive optical element (DOE), irrespective of whether that element includes a pattern of elongate diffractive features. Non-limiting example gratings include a surface-relief type grating comprising a series of closely spaced channels formed on the optical waveguide, or a volume grating or index-modulated grating formed in the optical-waveguide material.

Entry grating 34 is a diffractive structure configured to receive display image 20 and to couple the light of the display image into optical waveguide 32. After coupling into the optical waveguide, the display light propagates through the optical waveguide by total internal reflection (TIR) from the front and back faces of the optical waveguide. Exit grating 36 is a diffractive structure configured to controllably release the propagating display light from the optical waveguide in the direction of pupil position 30. To that end, the exit grating includes a series of light-extraction features arranged from weak to strong in the direction of display-light propagation through the optical waveguide, so that the display light is released at uniform intensity over the length of the exit grating. In this manner, expansion optic 28 may be configured to expand the exit pupil of display projector 22 so as to fill or slightly overfill the eyebox of the user. This condition provides desirable image quality and user comfort.

In some examples, expansion optic 28 may expand the exit pupil of display projector 22 in one direction only—e.g., the horizontal direction, in which the most significant eye movement occurs. Here, the display projector itself may offer a large enough exit pupil—natively, or by way of a vertical pre-expansion stage—so that vertical expansion within the optical waveguide is not necessary. In other examples, expansion optic 28 may be configured to expand the exit pupil in the horizontal and vertical directions. In such examples, display light propagating in a first direction within the optical waveguide may encounter a turning grating (not shown in FIG. 2) having a plurality of diffraction features arranged weak to strong in a first direction. The turning grating may be configured such that the light diffracted by the diffraction features is turned so as to propagate in a second direction, having now been expanded in the first direction. Parallel rays of the expanded light then encounter exit grating 36 and are out-coupled from the waveguide as described above. Despite the utility of diffractive optical elements for coupling light into and out of an optical waveguide, in-coupling and out-coupling optical elements based on reflection, refraction, and/or scattering are also envisaged, as alternatives to DOEs.

FIGS. 3A-D show additional aspects of expansion optic 28 in a more particular but non-limiting example. In these drawings, optical waveguide 32 comprises a transparent (e.g., glass or polymer) slab with a planar entry face 38 and an opposing, planar exit face 40. FIG. 3A is a plan view of entry face 38; FIG. 3B is a view of exit face 40 as seen through the entry face. FIGS. 3C and 3D are perspective views of the expansion optic 28 rotated in opposite directions about a horizontal axis aligned to the forward edge.

Expansion optic 28 includes an entry zone 42 where the display image is received through entry face 38 and an exit zone 44 where the expanded form of the display image is released through exit face 40. The expansion optic also includes an initial-expansion zone 46 that receives the display light from entry zone 42 and expands the display light en route to the exit zone. Expansion optic 28 includes a plurality of differently configured diffraction gratings arranged in the different zones.

In the illustrated example, rightward expansion grating 34R is arranged on entry face 38, and leftward expansion grating 34L is arranged on exit face 40. The rightward and leftward expansion gratings are entry gratings that extend through initial-expansion zone 46 and overlap in entry zone 42. Exit grating 36 is arranged on entry face 38, in exit zone 44. In other examples, any, some, or all of the diffraction gratings enumerated above may be arranged on the opposite face of the optical waveguide relative to the illustrated configuration.

Operationally, low-angle display light is received in entry zone 42, through entry face 38. Rightward expansion grating 34R and leftward expansion grating 34L cooperate to couple the low-angle display light into optical waveguide 32. Specifically, leftward expansion grating 34L diffracts some of the incoming, low-angle display light obliquely rightward and downward at a supercritical angle, such that it now propagates through the optical waveguide in a rightward and downward direction. At each bounce from entry face 38, the propagating light encounters rightward expansion grating 34R, which directs successive, increasing portions of the light directly downward. This function expands the display light in the rightward direction and conveys the rightward-expanded display light into exit zone 44. In a complementary manner, rightward expansion grating 34R diffracts some of the incoming, low-angle display light obliquely leftward and downward at a supercritical angle, such that it propagates through the optical waveguide in a leftward and downward direction. At each bounce from exit face 40, the propagating light encounters the leftward expansion grating, which directs successive, increasing portions of the light directly downward. This function expands the display light in the leftward direction and conveys the leftward-expanded display light into exit zone 44. In the exit zone, the propagating display light at each bounce from entry face 38 encounters exit grating 36, which directs successive, increasing portions of the rightward- and leftward-expanded display light out of optical waveguide 32. In this manner, the display light is expanded in the downward direction—i.e., perpendicular to the rightward and leftward expansion effected by the right- and leftward expansion gratings.

Each display image formed by monocular system 18 is a virtual image presented at a predetermined distance $Z_0$ in front of user O. The distance $Z_0$ is referred to as the 'depth of the focal plane' of the display image. In some monocular systems, the value of $Z_0$ is a fixed function of the design parameters of display projector 22, entry grating 34, exit grating 36, and/or other fixed-function optics. Based on the permanent configuration of these structures, the focal plane may be positioned at a desired depth. In one example, $Z_0$ may be set to 'infinity', so that each optical system presents a display image in the form of collimated light rays. In another example, $Z_0$ may be set to 200 centimeters, requiring the optical system to present each display image in the form of diverging light. In some examples, $Z_0$ may be chosen at design time and remain unchanged for all virtual imagery presented by the display system. Alternatively, the optical systems may be configured with electronically adjustable optical power, to allow $Z_0$ to vary dynamically according to the range of distances over which the virtual imagery is to be presented.

A binocular near-eye display device employing a fixed or variable focal plane may be capable of presenting virtual-display imagery perceived to lie at a controlled, variable distance in front of, or behind, the focal plane. This effect can be achieved by controlling the horizontal disparity of each pair of corresponding pixels of the right and left stereo images, as described below with reference to FIGS. 4A and 4B.

Figure 4B:
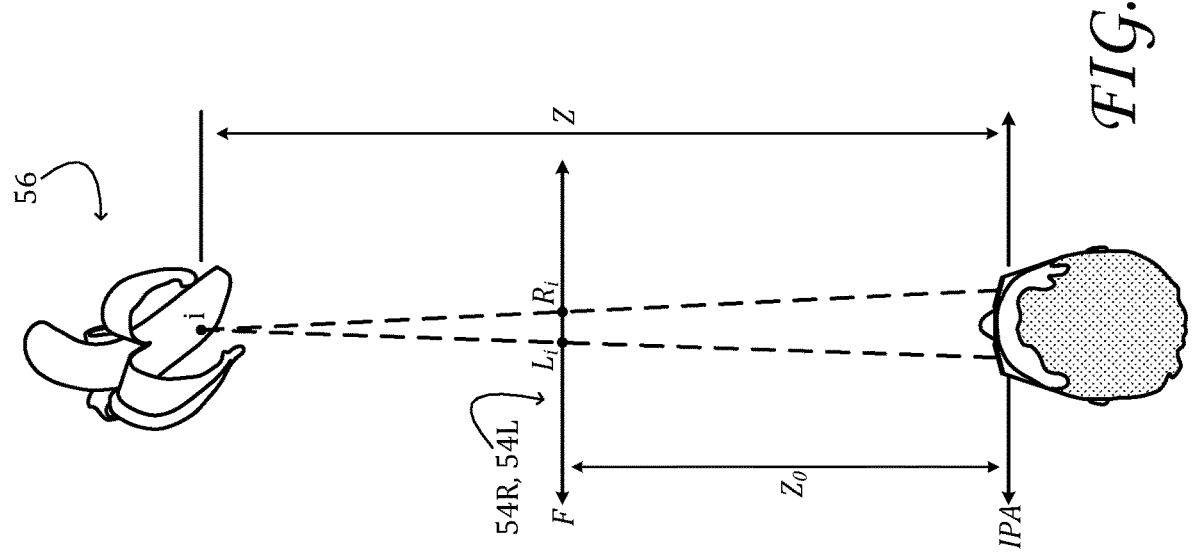
FIGS. 4A and 4B show aspects of stereoscopic display projection.
Figure 4A:
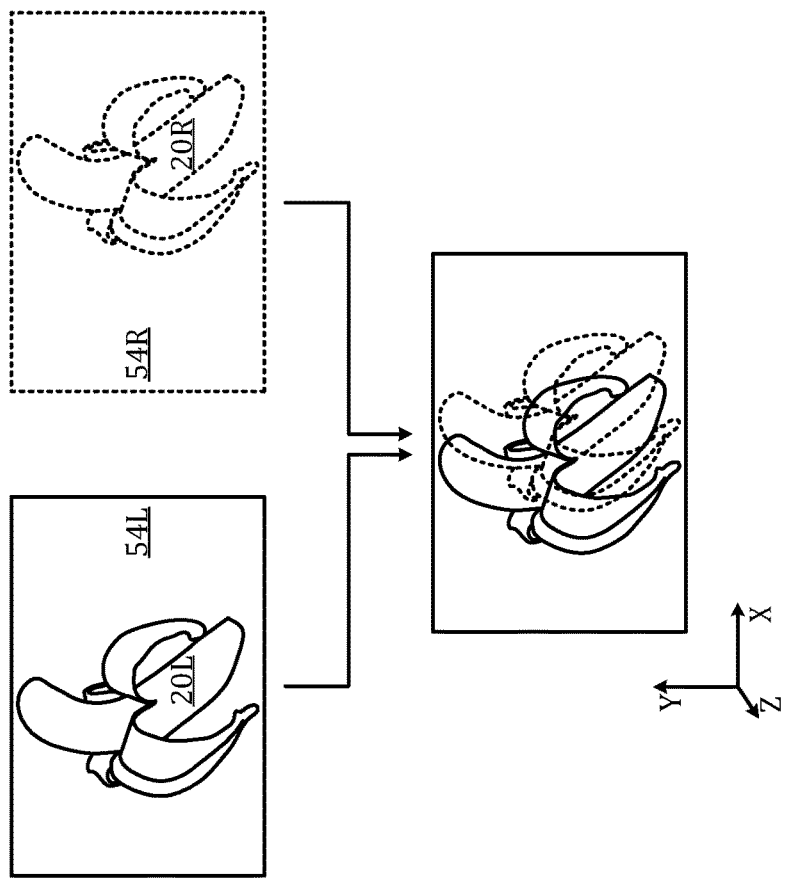

FIG. 4A shows right and left image frames 54R and 54L overlaid upon each other for ease of illustration. The right image frame encloses right display image 20R, and the left image frame encloses left display image 20L. Viewed concurrently through a near-eye display device 10, the right and left display images may appear to the user as 3D hologram 56, comprised of individually rendered loci. Each locus i of the visible surface of the hologram has a depth coordinate $Z_i$ associated with a corresponding pixel $(X_i, Y_i)$ of each of the right and left display images. The desired depth coordinate may be simulated as follows.

At the outset, a distance $Z_0$ to a focal plane F of the near-eye display system is chosen. Then the depth coordinate Z for every locus i of the visible surface of the hologram is set. This is done by adjusting the positional disparity of the two pixels corresponding to locus i in the right and left display images relative to their respective image frames. In FIG. 4B, the pixel corresponding to locus i in the right image frame is denoted $R_i$, and the corresponding pixel of the left image frame is denoted $L_i$. In FIG. 4B, the positional disparity is positive—i.e., $R_i$ is to the right of $L_i$ in the overlaid image frames. Positive positional disparity causes locus i to appear behind focal plane F. If the positional disparity were negative, the locus would appear in front of the focal plane. Finally, if the right and left display images were superposed (no disparity, $R_i$ and $L_i$ coincident) then the locus would appear to lie directly on the focal plane. Without tying this disclosure to any particular theory, the positional disparity D may be related to Z, $Z_0$, and to the interpupilary distance (IPD) of the user by $$D = IPD \times \left(1 - \frac{Z_0}{Z}\right).$$

In some examples, computer 12 maintains a model of the Cartesian space in front of the user, in a frame of reference fixed to near-eye display device 10. The user's pupil positions are mapped onto this space, as are the image frames 54R and 54L, each positioned at the predetermined depth $Z_0$. Then, the visible surface of hologram 56 is assembled, with each locus i of the viewable surface of the imagery having coordinates $X_i$, $Y_i$, and $Z_i$, in the common frame of reference. For each locus of the visible surface, two-line segments are constructed—a first line segment to the pupil position of the user's right eye and a second line segment to the pupil position of the user's left eye. The pixel $R_i$ of the right display image, which corresponds to locus i, is taken to be the intersection of the first line segment in right image frame 54R. Likewise, the pixel $L_i$ of the left display image is taken to be the intersection of the second line segment in left image frame 54L. This procedure automatically provides the appropriate amount of shifting and scaling to correctly render the visible surface, placing every locus i at the appropriate distance and with the appropriate perspective. In some examples, the approach outlined above may be facilitated by real-time estimation of the user's pupil positions. That variant is described hereinafter, with reference to FIG. 9. In examples in which pupil estimation is not attempted, a suitable surrogate for the pupil position, such as the center of rotation of the pupil position, or eyeball position, may be used instead.

Returning now to FIG. 2, controlling the stereo disparity of images confined to a focal plane is appropriate for rendering a three-dimensional effect, but it is less appropriate for shifting an entire display image back and forth in the user's field of view. To resolve depth in a complex scene, the human visual cortex interprets plural visual cues (e.g., occlusion and motion parallax), in addition to the neurologically coupled, oculomotor cues of binocular vergence and crystalline-lens accommodation. Stereo disparity correctly stimulates the binocular-vergence cue but does not stimulate the accommodation cue. Rather, the user's crystalline lenses remain focused on the fixed focal plane no matter the depth value indicated by the stereo disparity. When the disparity changes, but the focal plane does not move, a dissonance is perceived between the two oculomotor cues, which may result in user discomfort.

Accordingly, monocular system 18 of FIG. 2 may be configured to vary the focal plane on which virtual display imagery is presented. In the illustrated example, the monocular system includes a variable-focus lens 58 of variable optical power. Computer 12 is configured to control the focusing bias of the variable-focus lens such that the display light is imaged onto a focal plane positioned at a controlled, variable distance from pupil position 30. In stereoscopic near-eye display devices, this control feature may be enacted in combination with appropriate control of the stereo disparity as described above. Monocular system 18 of FIG. 2 also includes a fixed-focus lens 60 in series with variable-focus lens 58 and arranged to pre-bias the vergence of the display light released from expansion optic 28.

Applied in an AR display system, variable-focus lens 58 and/or fixed-focus lens 60 would alter the vergence of the external light received from opposite the user. In FIG. 2, accordingly, monocular system 18 further comprises a variable-compensation lens 62 of variable optical power and a fixed compensation lens 64. In some examples, the fixed optical power of fixed-compensation lens 64 may oppose and substantially reverse the fixed optical power of fixed-focus lens 60. When controlling the focusing bias such that the display light is imaged onto a focal plane positioned at a controlled, variable distance from user O, computer 12 may also synchronously control the compensation bias of the variable compensation lens such that the external light reaches the user with unchanged vergence.

In the approach above, the positional disparity sought to be introduced between corresponding pixels of the right and left display images is 'horizontal' disparity—viz., disparity parallel to the interpupilary axis of the user. Horizontal disparity is also known as 'convergence/divergence error'. Horizontal disparity partially mimics the effect of real-object depth on the human visual system, where images of a real object received in the right and left eyes are naturally offset parallel to the interpupilary axis. If the user focuses on such an object, and if the object is closer than infinity, the user's eye muscles will tend to rotate each eye about its vertical axis, to image that object onto the fovea of each eye, where visual acuity is greatest.

In contrast, vertical disparity between the left and right display images (also known as 'dipvergence') is uncommon in the natural world and undesirable for stereoscopic display. 'Vertical disparity' is the type of positional disparity in which corresponding loci of the right and left display images are offset in the vertical direction—viz., perpendicular to the IPA and to the direction that the user is facing. Although the eye musculature can rotate the eyes up or down to image objects above or below an user's head, this type of adjustment invariably is done on both eyes together. The eyes have quite limited ability to move one eye up or down independent of the other, so when presented with an image pair having vertical disparity, eye fatigue and/or headache results as the eye muscles strain to bring each image into focus.

Vertical disparity may result from imprecise positioning of a near-eye display device on the user's face, from imprecise eye-tracking, or from an anatomical defect of the user—e.g., strabismus or asymmetry of the face. In addition, vertical disparity may result from uncompensated extrinsic and intrinsic alignment errors in monocular systems 18 of near-eye display device 10.

Figure 5:
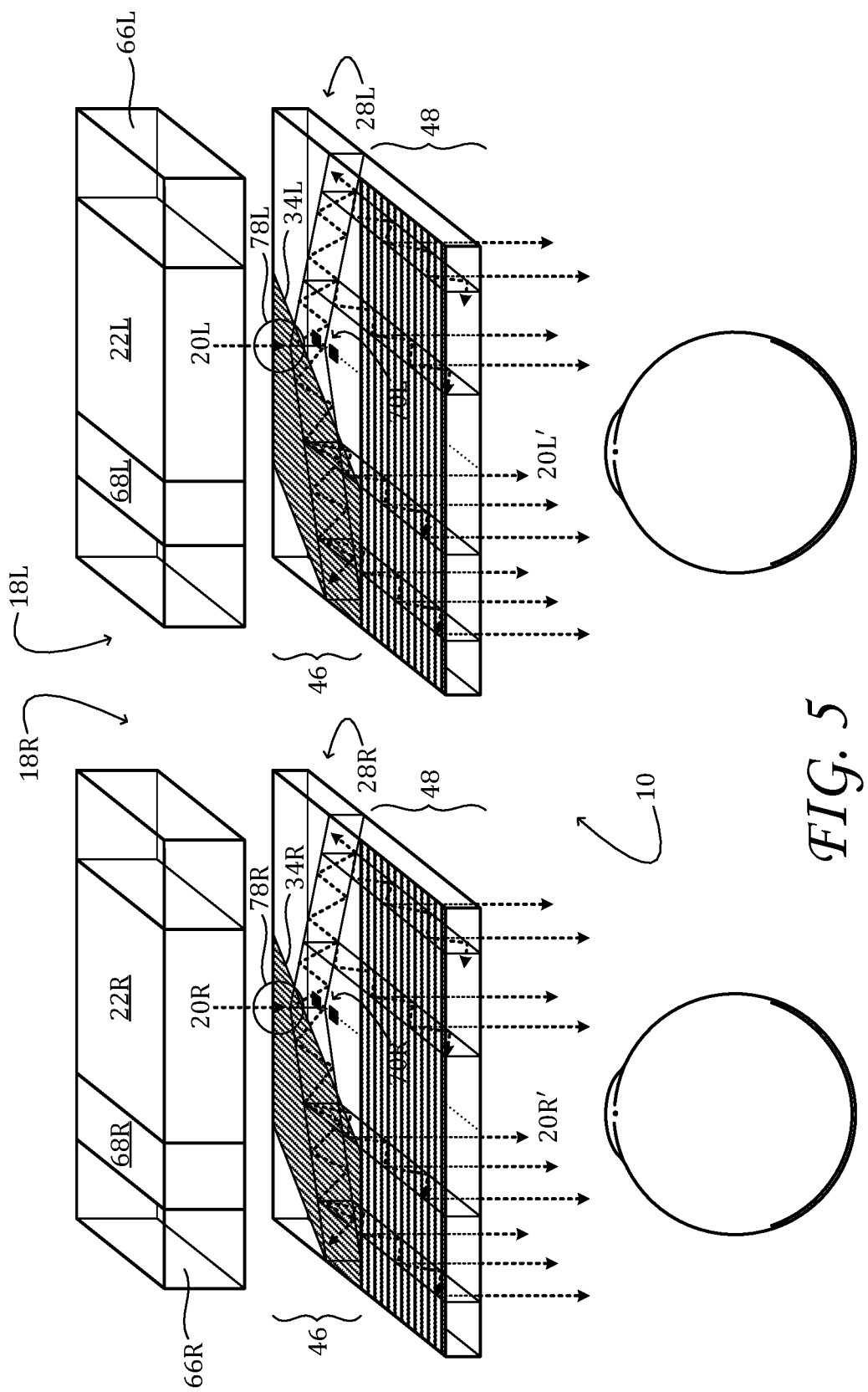
FIG. 5 shows additional aspects of the example near-eye display device of FIG. 1.

FIG. 5 shows additional aspects of example near-eye display device 10, highlighting the features used to address alignment error. Shown schematically in FIG. 5, near-eye display device 10 includes right and left display-module assemblies (DMAs) 66R and 66L, and right and left expansion optics 28R and 28L. Right expansion optic 28R is configured to receive right display image 20R from right display projector 22R and to release an expanded form 20R' of the right display image. Likewise, left expansion optic 28L is configured to receive left display image 20L from left display projector 22L and to release an expanded form 20L' of the left display image.

As noted hereinabove, a DMA may deviate from calibrated alignment due to improper factory calibration or use-related thermal or mechanical stresses (e.g., warming up or being dropped). Monocular alignment defects visible to the user may appear as a magnification and/or rotational shift. For example, if a DMA rotates relative to its associated expansion optic, then the corresponding display image will also rotate. Such defects, which generally differ for each eye, present various issues for holographic rendering.

To enable autocalibration, right DMA 66R includes a right inertial-measurement unit (IMU) 68R fixedly coupled to right display projector 22R. Left DMA 66L includes a left IMU 68L fixedly coupled to left display projector 22L. Each IMU includes at least one electronic gyroscope responsive to a rotation. In some examples, three electronic gyroscopes may be included in each IMU. By integration of angular acceleration over time, an IMU may furnish an output that defines its rotation about three rotational degrees-of-freedom (3DOF, e.g., $R_x$, $R_y$, $R_z$). By integration of linear acceleration over time, an IMU may furnish an output that defines its linear displacement along three additional degrees-of-freedom (e.g., X, Y, Z) for a combined six degrees-of-freedom (6DOF) measurement. In some examples, an IMU may also include a magnetometer configured to estimate absolute geomagnetic orientation and/or provide sensor fusion to avoid accelerometer and/or gyroscopic drift. As described further below, output from the right and left IMUs may be used to compute various 'alignment parameters' of near-eye display device 10—i.e., parameter values describing the alignment state of the near-eye display device. In some examples, one parameter value corresponds to the orientation of right IMU 68R relative to the orientation of left IMU 68L, which may be computed as the difference of vectors ($R_x$, $R_y$, $R_z$) for the two IMUs.

Even when the DMAs are pointed in the right direction and their joint relative angle is known, other effects may cause holographic distortion. Such distortion may vary by effect and magnitude, but may cause unstable holograms, comfort issues in sensitive users, and inability to properly fuse stereoscopic content. For example, an optical element in a DMA may change refractive index. Temperature shifts within the DMA could cause the refractive index of the lenses to change by 0.00045 units/° C. As the refractive index changes, activation of a given LCOS pixel will cause light to emerge from a slightly different angle. As LED emission wavelength also changes with temperature, the exit angle from the DMA may vary with temperature due to the temperature-dependent refractive index of the optics. Real-time temperature sensing and compensation may be insufficient to correct all of these effects.

Accordingly, near-eye display device 10 includes a plurality of ASP elements 70 each responsive to an angle of light of a display image received into the right or left expansion optic. The ASP elements are used, in effect, to assess the alignment state within each DMA and the orientation of that DMA relative to its corresponding expansion optic. As used herein, the 'angle of light of a display image received into an expansion optic' is generic to various interrelated angles. First, it will be appreciated that the mapping of a right or left pixel (ui, vi) into the user's field-of-view is controlled by the direction (in three dimensions) at which light from that pixel is received into the associated expansion optic. With reference to any suitable coordinate system, that direction can be resolved into a pair of angles—e.g., an elevation angle and an azimuth angle; as used herein, the term 'angle' equates to either element of the pair. While such angles may be sensed individually, proper calibration of a monocular system may include sensing of both elements of the pair.

Further, due to the static relative configuration among the optical waveguide and gratings of an expansion optic, sensing one 'angle of light of the display image' uniquely determines (for a given wavelength) other interrelated angles. For instance, the (elevation or azimuth) angle at which light is received at entry grating 34R determines the corresponding angle at which it reflects from the waveguide faces, which determines the angles at which it is released from the waveguide. It is even possible to determine an angle of light received into an expansion optic by sensing the angle of light that was incident on, but refracted through or reflected from, the expansion optic. Thus, an ASP element may be arranged at various different places on the expansion optic to sense, directly or indirectly, the 'angle of light of a display image received into an expansion optic'. Accordingly, the determination of where, on the expansion optic, to fix an ASP element may be driven by signal-to-noise considerations, and the like.

Figure 6:
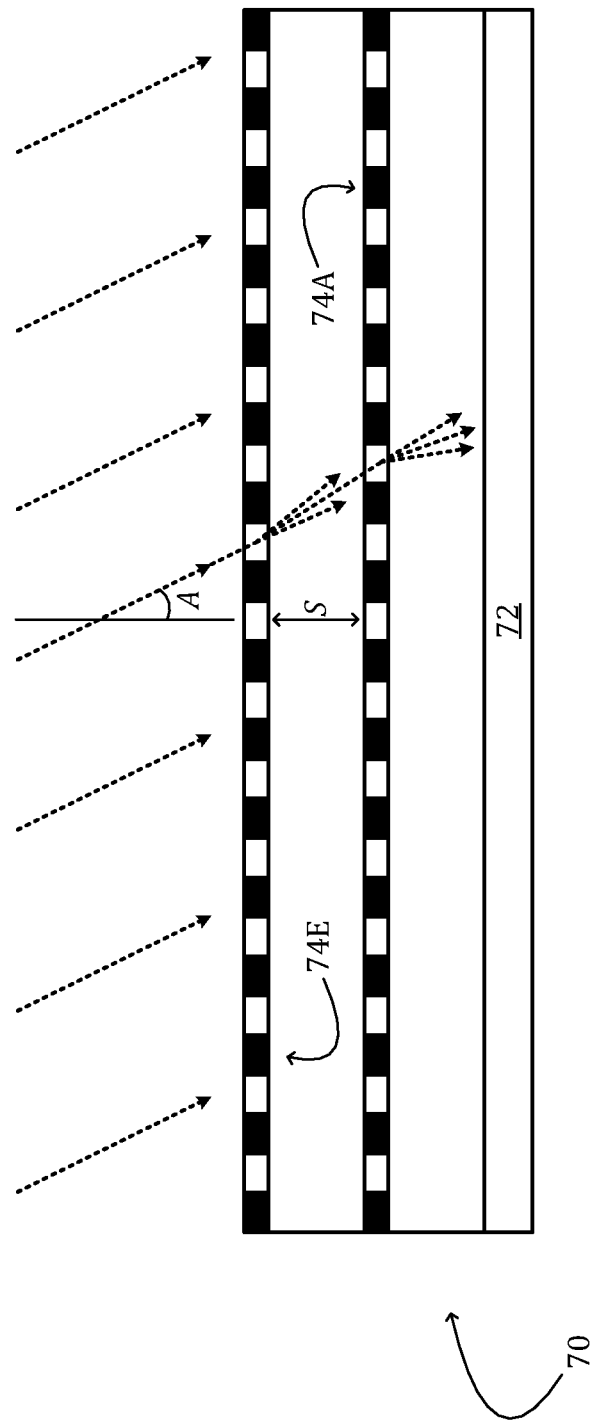
FIG. 6 shows aspects of an example ASP element.

FIG. 6 shows aspects of an ASP element 70 in one nonlimiting example. Each ASP element includes a photodiode 72 and one or more transmissive diffraction gratings 74 arranged in front of the photodiode. In the example shown in FIG. 6, ASP element 70 includes a transmissive entry grating 74E arranged over a transmissive analyzer grating 74A, with an inter-grating spacing S. According to the Moiré effect, the gaps in the entry and analyzer gratings line up at certain angles of incidence, allowing incident photons to reach photodiode 72; at other angles of incidence, photons transmitted through the entry grating are blocked by analyzer grating 74A and fail to reach the photodiode. The photodiode response, in that model, is proportional to the sine of the angle of incidence. However, in precision devices where the grating pitch is on the order of the wavelength of light, the sinusoidal relation is subject to diffractive interference. According to the Talbot effect, useful periodicity is recovered when the inter-grating spacing S is a half-integer multiple of the Talbot depth. That condition is the basis for a practical, precision ASP element. In some examples an ASP element may be configured to be responsive to visible light. In some examples an ASP element may be configured to be responsive to infrared (IR) light, useful implementations in which a calibration image is rendered in the IR (vide infra).

Returning now to FIG. 5, the plurality of ASP elements 70 of near-eye display device 10 comprises right and left sets, each set having one or more ASP elements. Right ASP set 70R is arranged optically downstream of right locus 78R where right display image 20R is received into right expansion optic 28R. Likewise, left ASP set 70L is arranged optically downstream of left locus 78L where left display image 20L is received into left expansion optic 28L. In the illustrated example, each ASP element of right ASP set 76R is fixedly coupled to the right expansion optic, and each ASP element of left ASP set 76L is fixedly coupled to the left expansion optic. More particularly, the ASP elements of the right ASP set in the illustrated example are arranged behind the in-coupling structures of the right expansion optic (comprising rightward-expansion grating 34R and leftward expansion grating 34L in the illustrated example), so as to receive light of the right display image that passes uncoupled through the in-coupling structures. The ASP elements of left ASP set 70L are arranged similarly in the illustrated example. In other examples, right and left sets of ASP elements may be coupled elsewhere on or within the corresponding expansion optics.

In examples in which a left or right set of ASP elements includes two or more ASP elements, at least one of the ASP elements of the set may be oriented so as to sense an elevation angle the light in a given coordinate system, and at least one other of the ASP elements of the set may be oriented so as to sense an azimuth angle of the light in the same coordinate system. More generally, at least two ASP elements of a set may sense non-parallel angles that span a three-dimensional vector space, from which elevation and azimuth angles may be determined.

Computer 12 is coupled operatively to right display projector 22R, left display projector 22L, right IMU 68R, left IMU 68L, and to the plurality of ASP elements 70. The computer is configured to receive output from the right IMU, the left IMU and the plurality of ASP elements. Based in part on the output, the computer renders display data for the right and left display projectors so as to provide predefined stereo disparity between the expanded forms, 20R' and 20L', of the right and left display images. To that end, the computer includes, as shown in FIG. 1, a rendering engine 80 and a calibration engine 82.

Figure 7:
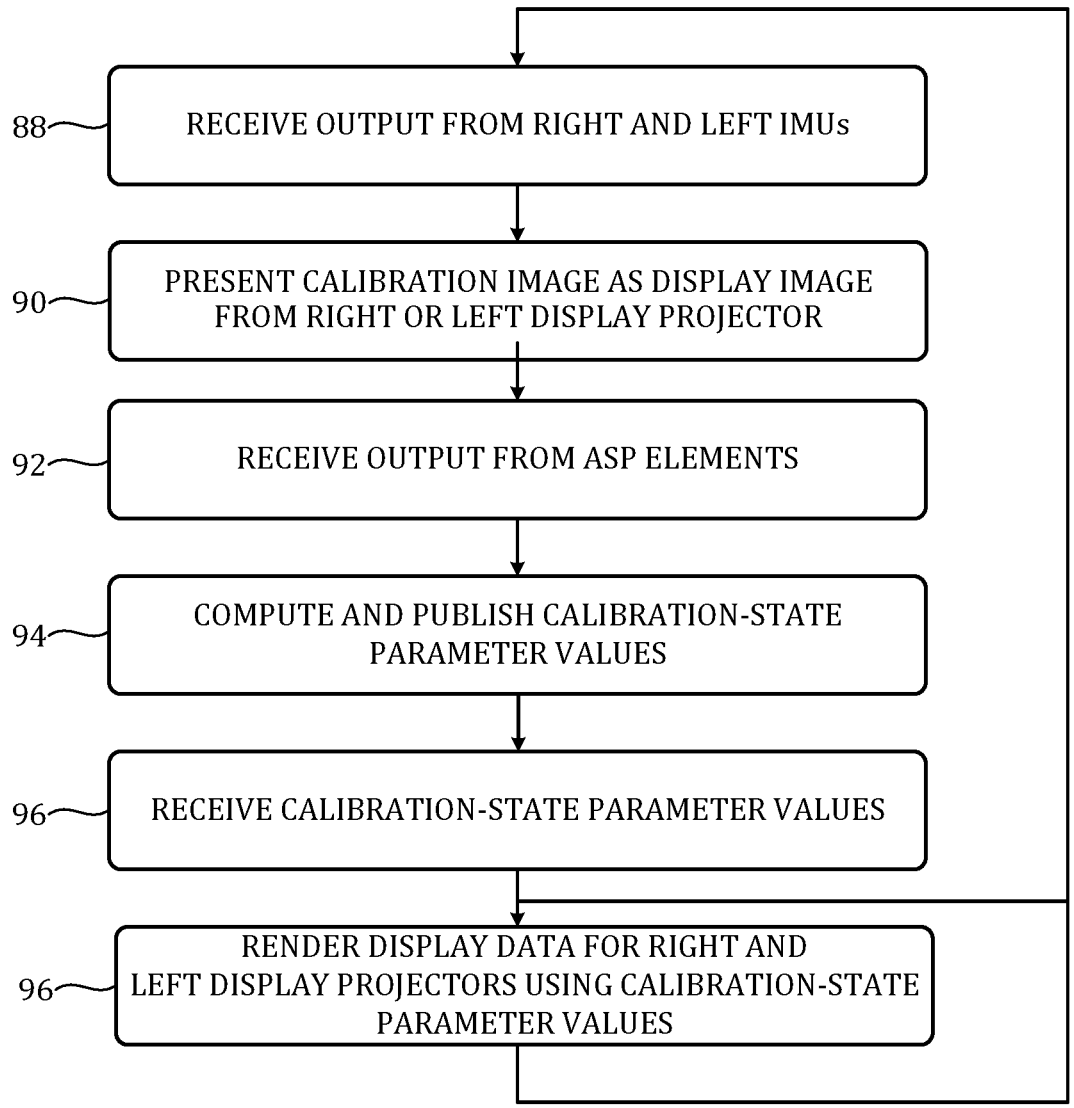
FIG. 7 shows aspects of an example autocalibrated display method that may be enacted in a near-eye display device.

FIG. 7 shows aspects of an example autocalibrated display method 86 that may be enacted by computer 12 of near-eye display device 10.

At 88 of method 86, the calibration engine of the computer receives output from the right IMU and from the left IMU. Such output includes the orientation of each IMU, which indicates the orientation of the display projector fixedly coupled to that IMU. The orientation may include $R_x$, $R_y$, $R_z$, as noted above.

At 90 the rendering engine presents a calibration image as a display image from the right and/or left display projector. Generally speaking, the nature of the calibration image is not particularly limited. The calibration image provides a pixel-level illumination that, when sensed by an ASP element, defines the calibration state of the near-eye display device, in whole or in part. Additional features of the calibration image may be intended to avoid distracting the user, as described in the following examples.

In one example, a calibration image may be rendered in the IR. To that end, an IRLED may be included as one of the light emitters 26 of display projector 22 (referring again to FIG. 2). Alternatively or in addition, in configurations that offer high S/N for ASP sensing, a calibration image may be rendered in the visible, but at an illumination level that the user is unlikely to notice. When a calibration image is presented on an LCOS color-sequential display, the LED colors may be switched at 360 Hz (possibly 480 Hz) using a lower frequency render (e.g., 45 Hz), with LSR applied to each color frame. At 360 Hz, the period for each frame may be as long as 2.7 ms, but a smaller value may be used for illumination (e.g., 2 ms). When measuring the light at the ASP elements, it is desirable to have light coming from a single angle which is measured, although disambiguation of signals from multiple pixels is also envisaged. One way to emit light from an individual pixel would be to occasionally 'steal' a frame at 360 Hz and use it for ASP element feedback. In other examples, an extra frame may be inserted, in order to lessen the risk that the user will notice 'flicker' due to the missing frame. The system may update data at 360 Hz, but internally, the system has the ability to perform faster updates. Rather than sending an entire new 1800 by 1350 frame, it may be possible to send a smaller update described concisely (e.g., turn off all pixels except for pixel 17 which should be 50% power for 0.4 ms).

Figure 8:
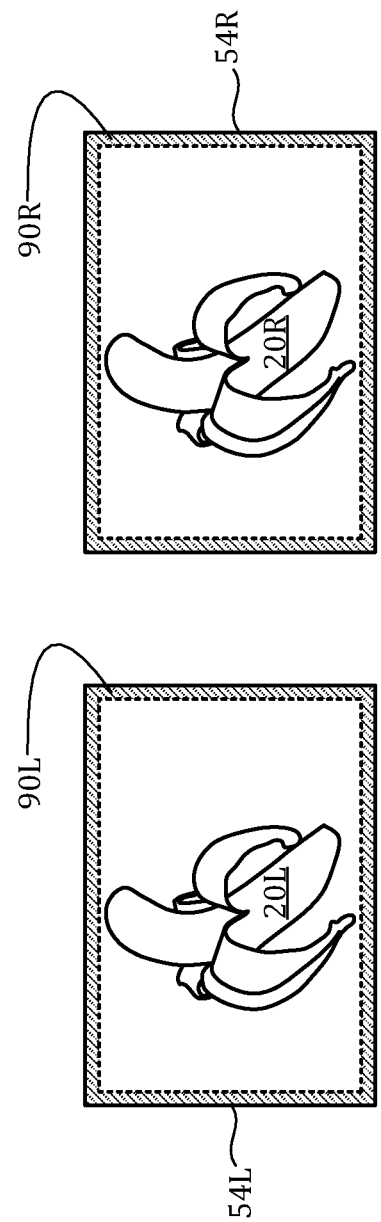
FIG. 8 shows aspects of example calibration images that may be used in connection with the autocalibrated display method of FIG. 7.

In some examples, the calibration image may be a peripheral portion of a display image that also includes non-calibration display content. In the example shown in FIG. 8, right image frame 54R includes peripheral portion 90R that may be reserved for a calibration image; left image frame 54L includes peripheral portion 90L that may be reserved for a calibration image. The motive for positioning the calibration image at the periphery of the display content is to avoid interrupting display content with dedicated calibration frames, which could be distracting to the user. The user is naturally less sensitive to imagery presented at the periphery of his or her field-of-view, so calibration data presented there, while readily perceptible to the ASP elements, may go largely unnoticed by the user. In another example, the frequency of the calibration is decreased as the near-eye display device warms up to a steady state. In this variant, most of the calibration images may be presented during boot-up, which provides a minimum of disruption to the user.

As described further below, a near-eye display device may include one or more ocular sensors responsive to nictitation of the user of the near-eye display device. When method 86 is enacted on such a device, the calibration image may be projected pursuant to the nictitation. In other words, the calibration image may be projected only when the user's eye is closed due to blinking. Alternatively or in addition, a near-eye display device may include one or more ocular sensors configured for gaze tracking—i.e., responsive to the direction of the user's gaze and optionally to the depth of the user's focus. When method 86 is enacted on such a device, the calibration image may be projected based on the gaze direction—e.g., projected into a region of the user's field-of-view that the user is not currently looking at. In another example, the calibration image may be projected onto a focal plane on which the user is not currently focused. In these and other examples, the calibration image may be projected during a saccade.

At 92 the calibration engine receives output from the plurality of ASP elements sufficient to determine an angle of light of the calibration image received into the right and left expansion optics. In some examples, output may be received from right and left sets of ASP elements. In some examples, each of the right and left sets may furnish data sufficient to determine two non-coplanar angles, which fully resolve the direction of the light received into the right and left expansion optics, in the context of the discussion further above.

At 94 the calibration engine computes alignment parameters for the near-eye display device. In some examples, the alignment parameters may include the absolute orientation of the right and left display projectors based on IMU data. In some examples, the alignment parameters may include the relative orientation of the right display projector in the frame of reference of the left display projector, or vice versa. Such parameters, whether absolute or relative, may be used as extrinsic alignment parameters of the right and left monocular systems of the near-eye display device, as they report on the alignment of the monocular systems as a whole (as opposed to the relative alignment of the components within each monocular system).

In some examples, the alignment parameters may further include the relative orientation of the expansion optic of each monocular system with respect to the corresponding display projector of that monocular system. Such parameters may be based on ASP-element data and may be used as intrinsic alignment parameters of the right and left monocular systems, as they report on the alignment state within each monocular system. In some examples, the alignment parameters may also include parameters for the lower triangular mixing matrix, the SO3-rotation between the sensors, and the additive bias of the complementary IMU. At 96 the calibration engine 'publishes' the alignment parameters computed at 94, in the sense that the alignment parameters are made available to other engines operating on the computer of the near-eye display device. In some examples, the alignment parameters may be published via a calibration-runtime API.

At 98 the rendering engine receives the published alignment parameters. At 100 the rendering engine renders display data for the right and left display projectors using the alignment parameters. Generally speaking, the alignment parameters received at 100 provide input to a geometric rendering process that, for subsequent holographic content, maps a desired locus i in three dimensions (e.g., $X_i$, $Y_i$, $Z_i$) in the user's field-of-view to a corresponding pixel $(u_i, v_i)_R$ of right display image 20R and to a corresponding pixel $(u_i, v_i)_L$ of left display image 20L, as described in connection to FIGS. 4A and 4B. In some examples, the mapping may employ closed-form linear-algebraic transformations. In some examples the mapping may be enacted in a mapping engine trained on IMU and ASP-element data, using principles of machine learning. Irrespective of the detailed implementation, the display data is rendered based in part on the output of the IMUs and ASP elements. This feature enables the rendering engine to provide the predefined stereo disparity between the expanded forms of the right and left display images. In so doing, the rendering engine may quell any vertical disparity between the expanded forms of the right and left display images.

Figure 9:
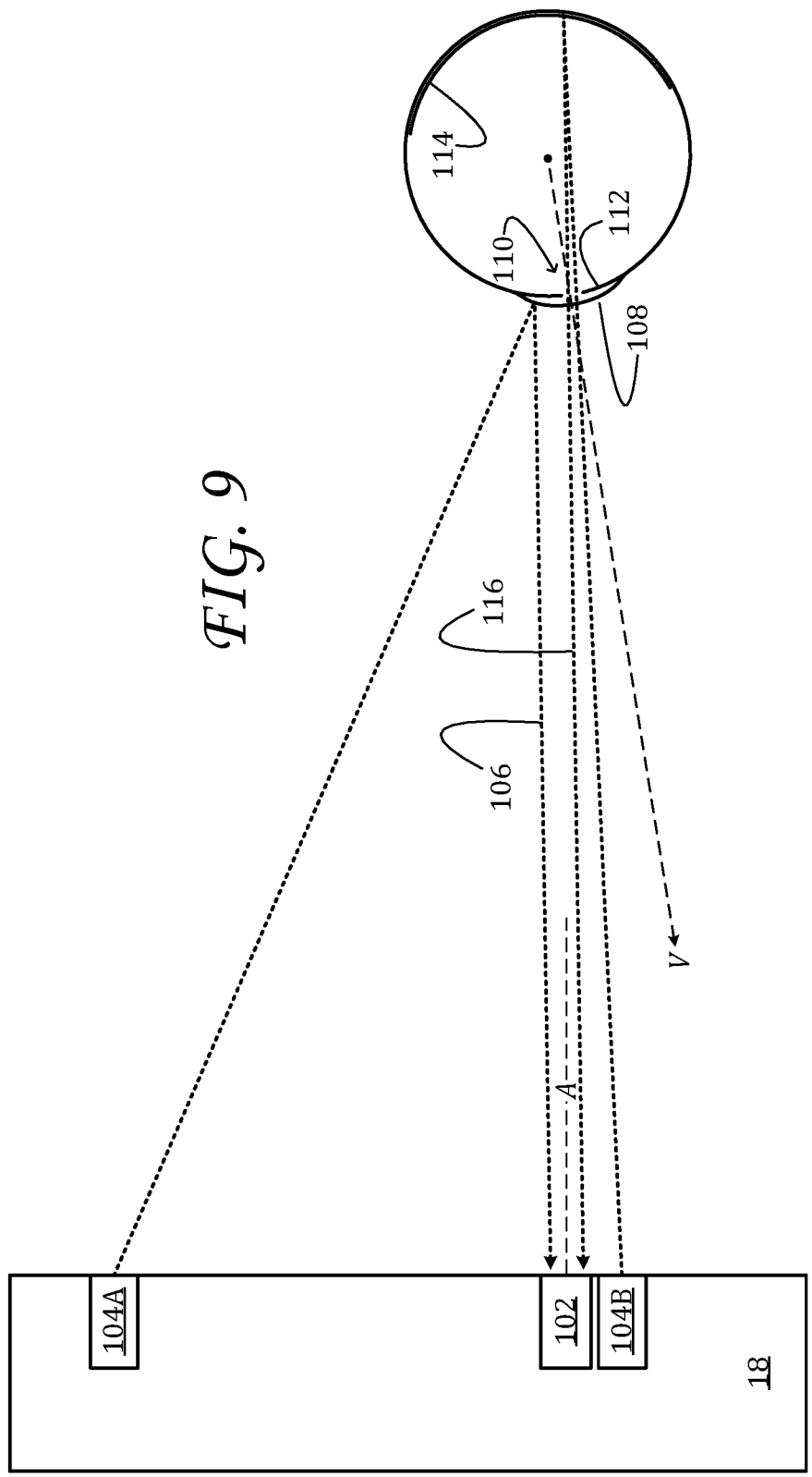
FIG. 9 shows additional aspects, related to ocular sensing, of the example near-eye display device of FIG. 1.

FIG. 9 is provided in order to illustrate schematically how ocular sensing may be enacted in near-eye display device 10. This approach may be used to sense the user's pupil positions for highly accurate 3D rendering, to accommodate a range of different users, and/or to support the autocalibrated display methods herein.

The configuration illustrated in FIG. 9 includes, for each monocular system 18, a camera 102, an on-axis lamp 104A and an off-axis lamp 104B. Each lamp may comprise a light-emitting diode (LED) or diode laser, for example, which emits infrared (IR) or near-infrared (NIR) illumination in a high-sensitivity wavelength band of the camera.

The terms 'on-axis' and 'off-axis' refer to the direction of illumination of the eye with respect to the optical axis A of camera 102. As shown in FIG. 9, off-axis illumination may create a specular glint 106 that reflects from the user's cornea 108. Off-axis illumination may also be used to illuminate the eye for a 'dark pupil' effect, where pupil 110 appears darker than the surrounding iris 112. By contrast, on-axis illumination from an IR or NIR source may be used to create a 'bright pupil' effect, where the pupil appears brighter than the surrounding iris. More specifically, IR or NIR illumination from on-axis lamp 104A may illuminate the retroreflective tissue of the retina 114, which reflects the illumination back through the pupil, forming a bright image 116 of the pupil. Image data from the camera is conveyed to associated logic of computer 12. There, the image data may be processed to resolve such features as one or more glints from the cornea, or the pupil outline. The locations of such features in the image data may be used as input parameters in a model—e.g., a polynomial model—that relates feature position to the apparent center of the pupil.

The configuration illustrated in FIG. 9 may also be used to sense relatively long-timescale pupilary movement associated with changing gaze vector or accommodation (when enacted concurrently in the right and left monocular systems) as well as relatively short-timescale saccadic movement. The configuration illustrated in FIG. 9 may also be used to sense nictitation. In other configurations, the pupil position may be determined, estimated, or predicted in various other ways—e.g., using an electrooculographic sensor in lieu of ocular imaging.

No aspect of the foregoing drawings or description should be interpreted in a limiting sense, because numerous variations, extensions, and omissions are also envisaged. For instance, there are multiple approaches for building angle-sensing mechanisms using ASP elements. A first method employs patch comparison. Even a single ASP element can be uniquely sensitive to a wide range of input angles. Temporal multiplexing of the DMA input signal allows the system to build a 2D image. During manufacturing, a reference image may be obtained, and image comparisons obtained in the runtime could infer magnification and rotational updates by comparing predictions against observations and finding an optimal warp.

A second method is based on peak finding on a set of ASP elements. A sufficiently sensitive ASP element could be used with temporal multiplexing to find the peak response. During manufacturing, the LCOS pixel that maximizes photodiode output is discovered. Later, during runtime, it may be determined which (e.g., different) pixel provided peak stimulus. The distance between the calibrated and observed pixels is then a single measurement point for the distance that light from that LCOS pixel has drifted. By building a grid of sensitive ASP elements, it is possible to spatially multiplex the optical feedback and use the collection of responses to decompose the magnification and rotation aspects. It will be noted that configurations alternative to the example ASP element of FIG. 6 also produce an ASP element effect. Depending on sensitivity, precision, and signal aliasing, it may be possible to introduce volume gratings with different angular response functions. Then, in peak-finding mode, one pixel type may be used to get an approximate solution, and another pixel type used for high-precision refinement.

A third method employs ASP-element inversion with phase offsets. Phase offsets in the ASP-element design may allow multiple sensors to provide higher precision output, even in the absence of locating a specific peak. Due to the periodic angular response function and unknown illumination magnitude, a single ASP element output is not invertible to obtain angle of incidence. However, by combining multiple pixels with phase offsets in their responses, it is possible to directly estimate both the original illumination intensity and the angle of incidence. Algorithms may be built similar to the method directly above, which use temporal multiplexing of LCOS output but perform ASP-element sampling in multiple sensors. This technique also may be extended by using volume gratings. Once the correspondence is known between predicted and observed angles, a correction can be readily computed.

Although the examples above focus largely on SLM-based display technologies, the methods herein are equally applicable to a µLED display, which can be readily adapted to provide an IR calibration image. Multiple design candidates exist, but one option is a system of stacked LEDs. In such a system, one LED in the stack may emit IR light, thereby allowing a calibration image to be decoupled from the display content, while using the same optical path. A µLED display operating at 120 Hz may provide a better user experience than color sequential display operating at 360 Hz, but nevertheless, short illumination times may be sought to prevent image blur due to head motion. This would suggest that there will be more time available for extra correction images to be displayed. Such a system would still use low-information updates (e.g., turn on red pixel 17 for 50% power for 0.4 ms).

The principles herein may also be implemented in near-eye display devices using scanning-laser technology. In addition to understanding DMA rotations with dual IMUs, ASP elements can help inform MEMS biphase timing offsets and mirror amplitudes. Currently, feedback mechanisms are used to estimate biphase timings and mirror amplitudes, but these systems are challenged with waveguide light efficiency, which can reduce the reliability of updates. Moving to an ASP-element feedback mechanism could make more light available behind the entry grating, which could increase user-perceived image quality while decreasing the occurrence of user-visible calibration patterns. In particular, it may be possible to perform the updates using only normal rendered images—e.g., by leveraging the inherent time multiplexing of the MEMS displays.

A scanning-laser projector does not have the concept of a pixel that can be illuminated for a duration of time; rather the display is inherently time-multiplexed. An ASP element sensitive to 0° will be triggered twice per MEMS fast scan cycle (assuming the laser is firing). One trigger will occur on the forward pass and another trigger will occur on the backwards pass.

Adding additional ASP elements sensitive to different input angles allows the system to directly observe the achieved trajectory. Phase, frequency, and amplitude may be computed directly as a function of time. Two ASP elements may be sufficient to constrain the hidden states, but three or more may help account for errors in the observations. These ASP elements would be triggered at 2× the fast scan frequency and would likely need to be sampled at a higher rate to find the peaks (e.g., faster than 100 MHz). ASP elements sensitive to the slow scan direction may also be added. They will only hit peaks once per frame, but the peak sampling will still need to be rapidly sampled in the area of potential peaks. Power and compute are reduced if the sampling only happens when triggers are likely.

The methods herein may be tied to a computer system of one or more computing devices. Such methods and processes may be implemented as an application program or service, an application programming interface (API), a library, and/or other computer-program product.

FIG. 10 provides a schematic representation of a computer 12 configured to provide some or all of the computer system functionality disclosed herein. Computer 12 may take the form of a personal computer, application-server computer, or any other computing device.

Computer 12 includes a logic system 14 and a computer-memory system 16. Computer 12 may optionally include a display system 18, an input system 118, a network system 120, and/or other systems not shown in the drawings.

Logic system 14 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

Computer-memory system 16 includes at least one physical device configured to temporarily and/or permanently hold computer system information, such as data and instructions executable by logic system 14. When the computer-memory system includes two or more devices, the devices may be collocated or remotely located. Computer-memory system 16 may include at least one volatile, nonvolatile, dynamic, static, read/write, read-only, random-access, sequential-access, location-addressable, file-addressable, and/or content-addressable computer-memory device. Computer-memory system 16 may include at least one removable and/or built-in computer-memory device. When the logic system executes instructions, the state of computer-memory system 16 may be transformed—e.g., to hold different data.

Aspects of logic system 14 and computer-memory system 16 may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

Logic system 14 and computer-memory system 16 may cooperate to instantiate one or more logic machines or engines. As used herein, the terms 'machine' and 'engine' each refer collectively to a combination of cooperating hardware, firmware, software, instructions, and/or any other components that provide computer system functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer system processor) cooperating with a remote component (e.g., a cloud computing service provided by a network of one or more server computer systems). The software and/or other instructions that give a particular machine or engine its functionality may optionally be saved as one or more unexecuted modules on one or more computer-memory devices.

Machines and engines may be implemented using any suitable combination of machine learning (ML) and artificial intelligence (AI) techniques. Non-limiting examples of techniques that may be incorporated in an implementation of one or more machines include support vector machines, multi-layer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)).

When included, display system 18 may be used to present a visual representation of data held by computer-memory system 16. The visual representation may take the form of a graphical user interface (GUI) in some examples. The display system may include one or more display devices utilizing virtually any type of technology. In some implementations, display system may include one or more virtual-, augmented-, or mixed reality displays.

When included, input system 118 may comprise or interface with one or more input devices. An input device may include a sensor device or a user input device. Examples of user input devices include a keyboard, mouse, or touch screen.

When included, network system 120 may be configured to communicatively couple computer 12 with one or more other computer. The network system may include wired and/or wireless communication devices compatible with one or more different communication protocols. The network system may be configured for communication via personal-, local- and/or wide-area networks.

One aspect of this disclosure is directed to a near-eye display device comprising right and left display projectors, right and left expansion optics, right and left inertial-measurement units (IMUs), a plurality of angle-sensitive pixel (ASP) elements, and a computer. The right expansion optic is configured to receive a right display image from the right display projector and to release an expanded form of the right display image. The left expansion optic configured to receive a left display image from the left display projector and to release an expanded form of the left display image. The right IMU is fixedly coupled to the right display projector, and the left IMU is fixedly coupled to the left display projector. The plurality of ASP elements are each responsive to an angle of light of a display image received into the right or left expansion optic. The computer is configured to: receive output from each of the right IMU, the left IMU and the plurality of ASP elements, and render display data for the right and left display projectors based in part on the output from each of the right IMU, the left IMU and the plurality of ASP elements, thereby providing predefined stereo disparity between the expanded forms of the right and left display images.

In some implementations, each of the right and left display projectors comprises a spatial light modulator, a scanning-laser projector, or a micro light-emitting-diode (µLED) projector. In some implementations, each of the right and left expansion optics includes an optical waveguide supporting total internal reflection of display light received therein. In some implementations, each of the right and left expansion optics includes a first optical element configured to couple light of a display image into the optical waveguide, and a second optical element configured to couple light of an expanded form of the display image out of the optical waveguide. In some implementations, both of the right and left expansion optics are configured to expand a display image in two orthogonal directions, thereby overfilling an anatomical eyebox of a wearer of the display device. In some implementations, each of the right and left IMUs includes an electronic gyroscope responsive to a rotation. In some implementations, each ASP element includes a photo diode and one or more diffraction gratings arranged in front of the photodiode. In some implementations, the plurality of ASP elements comprises: a right ASP element arranged optically downstream of a right locus where the right display image is received into the right expansion optic; and a left ASP element arranged optically downstream of a left locus where the left display image is received into the left expansion optic. In some implementations, the right ASP element is fixedly coupled to the right expansion optic, and the left ASP element is fixedly coupled to the left expansion optic. In some implementations, the right ASP element is arranged behind an in-coupling structure of the right expansion optic to receive light of the right display image that passes uncoupled through the in-coupling structure. In some implementations, the right or left display image comprises a calibration image. In some implementations, the calibration image is a peripheral portion of a display image further including non-calibration display content. In some implementations, the near-eye display device further comprises an ocular sensor responsive to nictitation of a wearer of the display device, and the calibration image is projected pursuant to the nictitation. In some implementations, the near-eye display device further comprises an ocular sensor responsive to gaze direction of a wearer of the display device, and the calibration image is projected based on the gaze direction. In some implementations, the calibration image is an infrared image, and each of the ASP elements is an infrared-responsive pixel element. In some implementations, providing the predefined stereo disparity includes quelling vertical disparity between the expanded forms of the right and left display images.

Another aspect of this disclosure is directed to a near-eye display device comprising right and left display projectors, right and left expansion optics, right and left inertial-measurement units (IMUs), right and left angle-sensitive pixel (ASP) elements, and a computer. The right expansion optic is configured to receive a right display image from the right display projector and to release an expanded form of the right display image. The left expansion optic configured to receive a left display image from the left display projector and to release an expanded form of the left display image. The right IMU is fixedly coupled to the right display projector, and the left IMU is fixedly coupled to the left display projector. The right ASP element is fixedly coupled to the right expansion optic and configured to sense an angle of light of the right display image received into the right expansion optic. The left ASP element is fixedly coupled to the left expansion optic and configured to sense an angle of light of the left display image received into the left expansion optic. The computer is configured to: receive output from each of the right IMU, the left IMU, the right ASP element, and the left ASP element, and render display data for the right and left display projectors based in part on the output from each of the right IMU, the left IMU, the right ASP element, and the left ASP element, thereby providing predefined stereo disparity between the expanded forms of the right and left display images.

In some implementations, the right ASP element is one of a right set of ASP elements arranged optically downstream of a right locus where the right display image is received into the right expansion optic. In some implementations, the right set of ASP elements are arranged behind an in-coupling structure of the right expansion optic to receive light of the right display image that passes uncoupled through the in-coupling structure.

Another aspect of this disclosure is directed to a near-eye display device comprising right and left display projectors, right and left expansion optics, right and left inertial-measurement units (IMUs), a plurality of angle-sensitive pixel (ASP) elements, and a computer. The right expansion optic is configured to receive a right display image from the right display projector and to release an expanded form of the right display image. The left expansion optic configured to receive a left display image from the left display projector and to release an expanded form of the left display image. Here the right or left display image includes a calibration image. The right IMU is fixedly coupled to the right display projector, and the left IMU is fixedly coupled to the left display projector. The plurality of ASP elements are each responsive to an angle of light of the calibration image received into the right or left expansion optic. The computer is configured to: receive output from each of the right IMU, the left IMU and the plurality of ASP elements, and render display data for the right and left display projectors based in part on the output from each of the right IMU, the left IMU and the plurality of ASP elements, to quell vertical disparity between the expanded forms of the right and left display images.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A near-eye display device comprising:
 a right display projector and a left display projector;
 a right expansion optic configured to receive a right display image from the right display projector and to release an expanded form of the right display image;
 a left expansion optic configured to receive a left display image from the left display projector and to release an expanded form of the left display image;
 a right inertial measurement unit (IMU) fixedly coupled to the right display projector, and a left IMU fixedly coupled to the left display projector;

a plurality of angle-sensitive pixel (ASP element) elements each responsive to an angle of light of a display image received into the right or left expansion optic; and a computer configured to:
receive output from each of the right IMU, the left IMU and the plurality of ASP elements, and
render display data for the right and left display projectors based in part on the output from each of the right IMU, the left IMU and the plurality of ASP elements, thereby providing predefined stereo disparity between the expanded forms of the right and left display images.

2. The near-eye display device of claim 1 wherein each of the right and left display projectors comprises a spatial light modulator, a scanning-laser projector, or a micro light-emitting-diode (µLED) projector.

3. The near-eye display device of claim 1 wherein each of the right and left expansion optics includes an optical waveguide supporting total internal reflection of display light received therein.

4. The near-eye display device of claim 3 wherein each of the right and left expansion optics includes a first optical element configured to couple light of a display image into the optical waveguide, and a second optical element configured to couple light of an expanded form of the display image out of the optical waveguide.

5. The near-eye display device of claim 1 wherein both of the right and left expansion optics are configured to expand a display image in two orthogonal directions, thereby overfilling an anatomical eyebox of a wearer of the display device.

6. The near-eye display device of claim 1 wherein each of the right and left IMUs includes an electronic gyroscope responsive to a rotation.

7. The near-eye display device of claim 1 wherein each ASP element includes a photodiode and one or more diffraction gratings arranged in front of the photodiode.

8. The near-eye display device of claim 1 wherein the plurality of ASP elements comprises: a right ASP element arranged optically downstream of a right locus where the right display image is received into the right expansion optic; and a left ASP element arranged optically downstream of a left locus where the left display image is received into the left expansion optic.

9. The near-eye display device of claim 8 wherein the right ASP element is fixedly coupled to the right expansion optic, and the left ASP element is fixedly coupled to the left expansion optic.

10. The near-eye display device of claim 8 wherein the right ASP element is arranged behind an in-coupling structure of the right expansion optic to receive light of the right display image that passes uncoupled through the in-coupling structure.

11. The near-eye display device of claim 1 wherein the right or left display image comprises a calibration image.

12. The near-eye display device of claim 11 wherein the calibration image is a peripheral portion of a display image further including non-calibration display content.

13. The near-eye display device of claim 11 further comprising an ocular sensor responsive to nictitation of a wearer of the display device, and wherein the calibration image is projected pursuant to the nictitation.

14. The near-eye display device of claim 11 further comprising an ocular sensor responsive to gaze direction of a wearer of the display device, and wherein the calibration image is projected based on the gaze direction.

15. The near-eye display device of claim 11 wherein the calibration image is an infrared image, and wherein each of the ASP elements is an infrared-responsive pixel element.

16. The near-eye display device of claim 1 wherein providing the predefined stereo disparity includes quelling vertical disparity between the expanded forms of the right and left display images.

17. A near-eye display device comprising:
a right display projector and a left display projector;
a right expansion optic configured to receive a right display image from the right display projector and to release an expanded form of the right display image;
a left expansion optic configured to receive a left display image from the left display projector and to release an expanded form of the left display image;
a right inertial measurement unit (IMU) fixedly coupled to the right display projector, and a left IMU fixedly coupled to the left display projector;
a right angle-sensitive pixel (ASP element) element fixedly coupled to the right expansion optic and configured to sense an angle of light of the right display image received into the right expansion optic;
a left ASP element fixedly coupled to the left expansion optic and configured to sense an angle of light of the left display image received into the left expansion optic;
a computer configured to:
receive output from each of the right IMU, the left IMU, the right ASP element, and the left ASP element, and
render display data for the right and left display projectors based in part on the output from each of the right IMU, the left IMU, the right ASP element, and the left ASP element, thereby providing predefined stereo disparity between the expanded forms of the right and left display images.

18. The near-eye display device of claim 17 wherein the right ASP element is one of a right set of ASP elements arranged optically downstream of a right locus where the right display image is received into the right expansion optic.

19. The near-eye display device of claim 18 wherein the right set of ASP elements are arranged behind an in-coupling structure of the right expansion optic to receive light of the right display image that passes uncoupled through the in-coupling structure.

20. A near-eye display device comprising:
a right display projector and a left display projector;
a right expansion optic configured to receive a right display image from the right display projector and to release an expanded form of the right display image;
a left expansion optic configured to receive a left display image from the left display projector and to release an expanded form of the left display image, wherein the right or left display image includes a calibration image;
a right inertial measurement unit (IMU) fixedly coupled to the right display projector, and a left IMU fixedly coupled to the left display projector;
a plurality of angle-sensitive pixel (ASP element) elements each responsive to an angle of light of the calibration image received into the right expansion optic or into the left expansion optic; and
a computer configured to:
receive output from each of the right IMU, the left IMU, and the plurality of ASP elements, and
render display data for the right and left display projectors based in part on the output from each of the right IMU, the left IMU and the plurality of ASP elements, to quell vertical disparity between the expanded forms of the right and left display images.

\* \* \* \* \*